(12) United States Patent
Busam et al.

(10) Patent No.: US 11,943,419 B2
(45) Date of Patent: Mar. 26, 2024

(54) DEPTH OF FIELD IMAGE REFOCUSING

(71) Applicant: HUAWEI TECHNOLOGIES CO., LTD., Guangdong (CN)

(72) Inventors: Benjamin Busam, Munich (DE); Matthieu Hog, Munich (DE); Steven George McDonagh, London (GB); Gregory Slabaugh, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 17/479,911

(22) Filed: Sep. 20, 2021

(65) Prior Publication Data

US 2022/0006998 A1    Jan. 6, 2022

Related U.S. Application Data

(63) Continuation of application No. PCT/EP2019/057138, filed on Mar. 21, 2019.

(51) Int. Cl.
*G06T 7/593*    (2017.01)
*G06N 20/00*    (2019.01)
(Continued)

(52) U.S. Cl.
CPC .......... *H04N 13/128* (2018.05); *G06N 20/00* (2019.01); *G06T 7/593* (2017.01); *G06T 2207/10028* (2013.01); *H04N 2013/0081* (2013.01)

(58) Field of Classification Search
CPC .......... G06T 7/593; G06T 2207/10028; G06T 2207/20084; G06T 2207/20081;
(Continued)

(56) References Cited

U.S. PATENT DOCUMENTS 7,623,726 B1\*  11/2009  Georgiev ............. H04N 13/128
                                                            382/263
8,094,904 B2\*   1/2012  Slabaugh ................ G06T 5/005
                                                            378/62
(Continued)

FOREIGN PATENT DOCUMENTS

EP          3166073 A1    5/2017
WO       2020187425 A1    9/2020

OTHER PUBLICATIONS

Barron, "A General and Adaptive Robust Loss Function," arXiv preprint, arXiv:1701.03077v10, Apr. 2019, 19 pages.
(Continued)

*Primary Examiner* — Wesner Sajous
(74) *Attorney, Agent, or Firm* — Fish & Richardson P.C.

(57) ABSTRACT

An image processing device comprising a processor configured to generate a refocused image from an input image and an map indicating depth information for the image, by the steps of: for each of a plurality of planes associated with respective depths within the image: generating a depth mask having values indicating whether regions of the input image are within a specified range of the plane, wherein an assessment of whether a region is within the specified range of the plane is made through the evaluation of a differentiable function of the range between regions of the input image and the plane as determined from the map; generating a masked image from the input image and the generated depth mask; refocusing the masked image using a blurring kernel to generate a refocused partial image; and generating the refocussed image from the plurality of refocussed partial images.

14 Claims, 12 Drawing Sheets

All-in-focus image

Disparity map

Refocused images

(51) Int. Cl.
*H04N 13/128* (2018.01)
*H04N 13/00* (2018.01)

(58) Field of Classification Search
CPC . G06T 2207/20201; G06T 9/002; G06T 5/50; G06T 5/20; G06T 3/60; G06T 2207/10012; G06T 2215/16; G06T 11/60; G06T 7/586; G06T 5/003; G06N 20/20; G06N 3/048; G06N 3/02; H04N 13/128; H04N 2013/0081; H04N 2213/006; H04N 2213/003
See application file for complete search history.

(56) References Cited

U.S. PATENT DOCUMENTS

| | | |
|---|---|---|
| 2008/0131019 A1 | 6/2008 | Ng |
| 2010/0085351 A1 | 4/2010 | Deb et al. |
| 2013/0063571 A1 | 3/2013 | Ishii |
| 2014/0003732 A1 | 1/2014 | Le Floch |
| 2015/0062370 A1 | 3/2015 | Shroff et al. |
| 2016/0165206 A1 | 6/2016 | Huang et al. |
| 2016/0350930 A1 | 12/2016 | Lin et al. |
| 2017/0061635 A1* | 3/2017 | Oberheu .............. G06T 11/60 |
| 2018/0061020 A1* | 3/2018 | Hiasa .................. G06T 3/60 |

OTHER PUBLICATIONS

Khamis, et al. "Stereonet: Guided hierarchical refinement for real-time edge-aware depth prediction," Proceedings of the European Conference on Computer Vision (ECCV), Jul. 2018, 18 pages.

PCT International Search Report and Written Opinion issued in International Application No. PCT/EP2019/057138 dated Dec. 10, 2019, 13 pages.

Srinivasan et al. "Aperture supervision for monocular depth estimation," ArXiv preprint, arXiv:1711.07933v2, Mar. 2018, 13 pages.

Tao et al., "Relative Depth Estimation with an Uncalibrated Camera for Image Refocus," 2015 International Conference on Wireless Communications & Signal Processing (WCSP), Oct. 2015, 5 pages.

Wadhwa et al., "Synthetic depth-of-field with a single-camera mobile phone," ACM Transactions on Graphics (TOG), vol. 37, No. 4, Article 64, Aug. 2018, 13 pages.

Wang et al., "DeepLens: shallow depth of field from a single image," arXiv preprint arXiv: 1810.08100, Oct. 18, 2018, 11 pages.

Yu et al., "Dynamic Depth of Field on Live Video Streams," Computer Graphics International Conference 2011, Jun. 2011, 9 pages.

* cited by examiner

DEPTH OF FIELD IMAGE REFOCUSING

CROSS-REFERENCE TO RELATED APPLICATIONS

This application is a continuation of International Application No. PCT/EP2019/057138, filed on Mar. 21, 2019, the disclosure of which is hereby incorporated by reference in its entirety.

FIELD

The present disclosure relates to performing image refocusing. Some aspects relate to training an image processing model that performs refocusing of input images.

BACKGROUND

The depth of field (DOF) of an image refers to the depth range within which all objects are sharp (in-focus). Shallow DOF images, for example, can be used to isolate an object from its background and are typically used for portrait and macro photography.

The depth of field of an image depends, in part, on the size of the aperture of the device used to capture the image. Consequently, some image processing devices with narrow apertures, such as smartphones, are typically unable to render shallow depth of field images optically, instead capturing substantially all-in-focus images.

However, through suitable digital image processing techniques, the effects of a shallow depth of field can be imitated, or synthesised, by refocusing a digital image. Some approaches to computationally refocusing a digital image utilise depth information for the image. An example of how an input digital image can be computationally refocused is illustrated in FIG. 1.

FIG. 1 shows an all-in-focus image 101. A map containing depth information for the image 101 is shown at 103. In this example, the map is a disparity map, though in other examples it could be a depth map. A disparity map encodes the spatial shift between blocks of a pair of (typically stereo) images representing a common scene. When the pair of images are captured by two spatially separated cameras, a point in the scene is projected to different block locations within each image. The coordinate shift between these different block locations is the disparity. Thus, each block in the disparity map encodes the spatial shift between a part of the scene represented in the pair of images. A block of the disparity map encodes the coordinate shift between a part of the scene represented in a co-located block in one of the pair of images and that part of the scene represented in the other of the pair of images. The disparity value for that block of the disparity map represents the coordinate shift in a rectified image domain.

A block refers to a block of one or more pixels of the map. Parts of the scene that are at greater depth from the image plane have a relatively smaller block displacement between the pair of images than those parts of the scene that are at a shallower depth from the image plane. Thus, the values of the disparity map are typically inversely proportional to depth values of a corresponding depth map.

From the input image 101 and map 103, refocused images 105 and 107 can be generated by computationally refocusing image 101. In image 105, the background has been blurred through refocusing with the foreground remaining in focus; in image 107, the foreground has been blurred through refocusing with the background remaining in focus.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to one aspect there is provided an image processing device comprising a processor configured to generate a refocused image from an input image and a map indicating depth information for the input image, by the steps of: for each of a plurality of planes associated with respective depths within the image: generating a depth mask having values indicating whether regions of the input image are within a specified range of the plane, wherein an assessment of whether a region is within the specified range of the plane is made through the evaluation of a differentiable function of the range between regions of the input image and the plane as determined from the map; generating a masked image from the input image and the generated depth mask; refocusing the masked image using a blurring kernel to generate a refocused partial image; and generating the refocussed image from the plurality of refocussed partial images.

This enables a refocusing step to be performed that is differentiable, which allows the refocusing step to be implemented as a layer within a learnable pipeline.

The plurality of planes may define a depth range, and the input image may have a depth of field spanning the depth range of the plurality of planes. This can enable shallow depth of field images to be refocused.

The map indicating depth information for the image may be a disparity map and each of the plurality of planes might be a plane at a respective disparity value; or (ii) the map indicating depth information for the image may be a depth map and each of the plurality of planes might a plane at a respective depth. This provides flexibility in using either depth or disparity maps in the refocusing stage.

The function may vary smoothly between a lower bound and an upper bound that defines a function value range, the function having a value within a first half of its range when an image region for which the function is being evaluated is within the specified range of the plane, and having a value within the second half of its range when an image region for which the function is being evaluated is not within the specified range of the plane. This enables the function value returned from evaluating the function to indicate whether a region of the image is within the specified range of the plane or not.

The differentiable function may be evaluated to assess whether the condition of $$|D(x) - d'| < \frac{1}{a}$$

is satisfied, where $D(x)$ is the value of the disparity or depth map for an image region at a block x of the input image, d' is the disparity or depth of the plane and a is the size of an aperture, an image region being determined to be within the specified range of the plane when the condition is satisfied and determined not to be within the specified range of the plane when the condition is not satisfied. This provides a quantitative condition to determine whether an image region is within a specified range of the plane.

The depth mask may specify values for each block of one or more pixels of the input image. This allows each block of the image to be assessed to determine whether it is within the specified range of the plane.

The blurring kernel is a radial kernel having a radius which is a function of the size of an aperture, and the difference in depth or disparity between the plane and a focal plane. This enables blurring to be dependent on the depth of the plane.

The generated masked image may contain only those regions of the input image determined to be within the specified range of the plane. This enables partial images for each plane to be layered on top of each other.

According to a second aspect there is provided method of training an image processing model, comprising:
  receiving a plurality of tuples of images, each tuple of images comprising a pair of images representing a common scene and a refocused training image of the scene;
  for each tuple of images:
  (i) processing the pair of images using the image processing model to estimate a map indicating depth information for the scene;
  (ii) for each of a plurality of planes associated with respective depths within the image: generating a depth mask having values indicating whether regions of an input image are within a specified range of the plane, wherein an assessment of whether a region is within the specified range of the plane is made through the evaluation of a differentiable function of the range between regions of the input image and the plane as determined from the estimated map; generating a masked image from the input image and the generated depth mask; and refocusing the masked image using a blurring kernel to generate a refocused partial image;
  (iii) generating a refocussed image from the plurality of refocussed partial images;
  (iv) estimating the difference between the generated refocused image and the refocused training image; and
  (v) adapting the image processing model in dependence on the estimated difference.

This provides an approach to training an image processing model to generated refocused images that is learnable through the refocusing.

The generated map may be of equal resolution to the pair of images and the input image be one of the pair of images. This enables the refocusing stage to be performed sequentially with the depth estimation stage and a full-resolution refocused image to be generated from the refocusing stage without the need to upsampling in that stage.

The generated map may be of reduced resolution compared to the pair of images and the input image be formed as a reduced-resolution image of one of the pair of images. This enables steps of the refocusing stage to be performed on fewer image blocks.

The step (iii) of generating the refocused image may be performed using the reduced resolution map and may further comprise the steps of: generating a reduced-resolution refocussed image from the plurality of refocused partial images; and up-sampling the reduced-resolution refocused image to generate the refocused image. This enables a full-resolution refocused image to be generated.

According to a third aspect there is provided a method of adapting an image processing model, comprising:
  receiving a plurality of tuples of images, each tuple of images comprising a pair of images representing a common scene and a refocused training image of the scene;
  for each tuple of images:
  processing the pair of images using an image processing model, comprising:
    (i) processing the pair of images using a computational neural network to extract features from the pair of images;
    (ii) comparing the features across a plurality of disparity planes to generate a cost volume; and
    (iii) generating a mask for each of a plurality of planes associated with respective depths within the image from respective up-sampled slices of the cost volume;
  performing a refocusing stage, comprising:
    (iv) for each of the said plurality of planes:
  generating a masked image from an input image and the generated mask; refocusing the masked image using a blurring kernel to generate a refocused partial image;
    (v) generating a refocussed image from the plurality of refocussed partial images;
    (vi) estimating the difference between the generated refocused image and the refocused training image; and
    (vii) adapting the image processing model in dependence on the estimated difference.

This can enable refocusing to be performed directly from the cost volumes and can reduce the number of steps of the learnable pipeline.

There may be provided an image processing model adapted by the methods herein to generate a refocused image from a pair of input images representing a common scene. This can provide an adapted, or trained image processing model that generates refocused images from input images.

There may be provided an image processing device comprising a processor and a memory, the memory storing in non-transient form instructions executable by the processor to implement an image processing model adapted by any of the methods herein to generate a refocused image from a pair of input images representing a common scene. This can enable an adapted, or trained, image processing model to be implemented within a device to perform refocusing.

The above features may be combined as appropriate, as would be apparent to a skilled person, and may be combined with any of the aspects of the examples described herein.

BRIEF DESCRIPTION OF FIGURES

Examples will now be described with reference to the accompanying drawings, in which.

Figure 1:
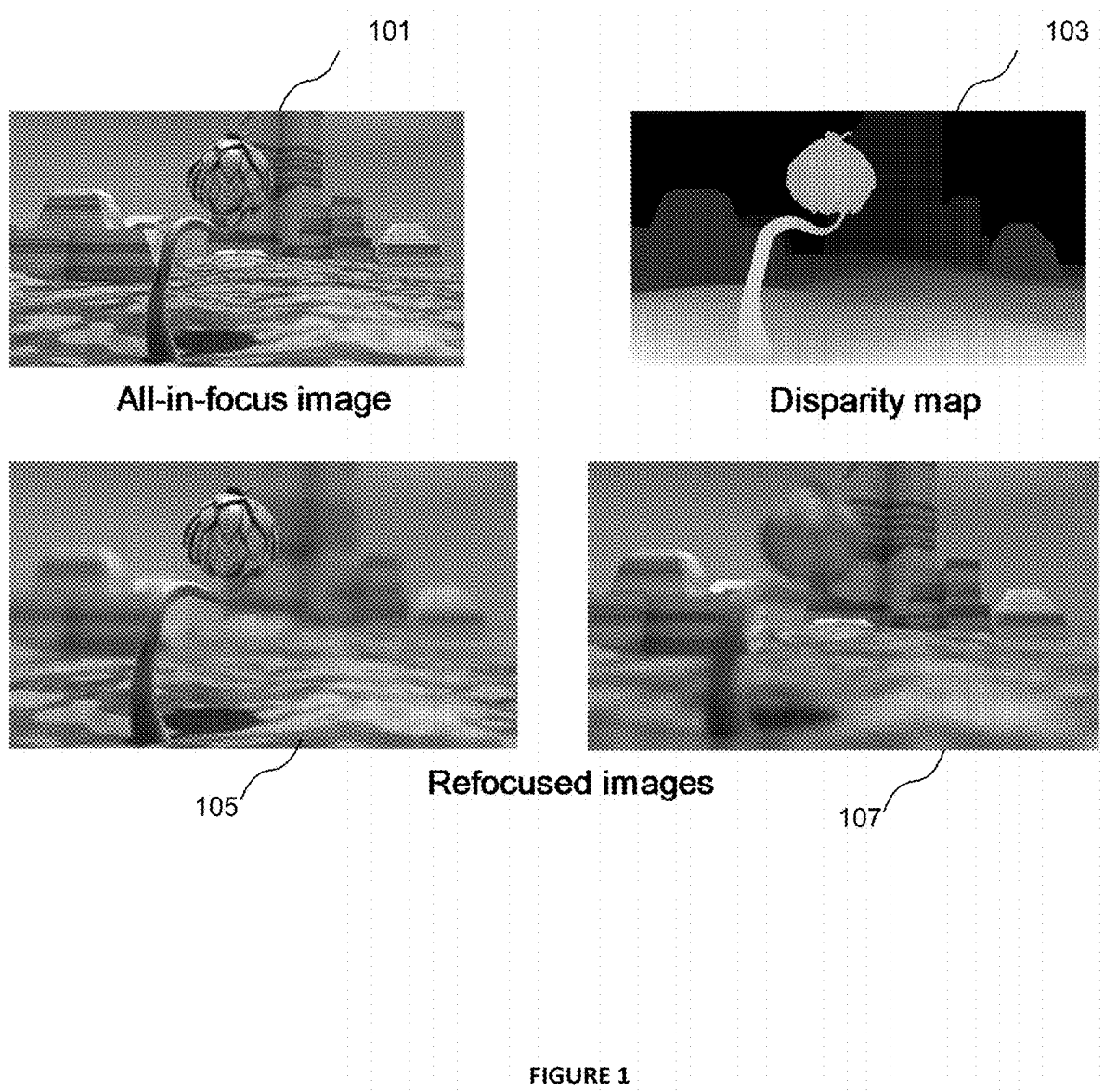
FIG. 1 shows an example of generating computationally refocused images from an input digital image.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the application. The present application is not limited to the embodiments described herein and various modifications to the disclosed embodiments will be apparent to those skilled in the art. Embodiments are described by way of example only.

Figure 2:
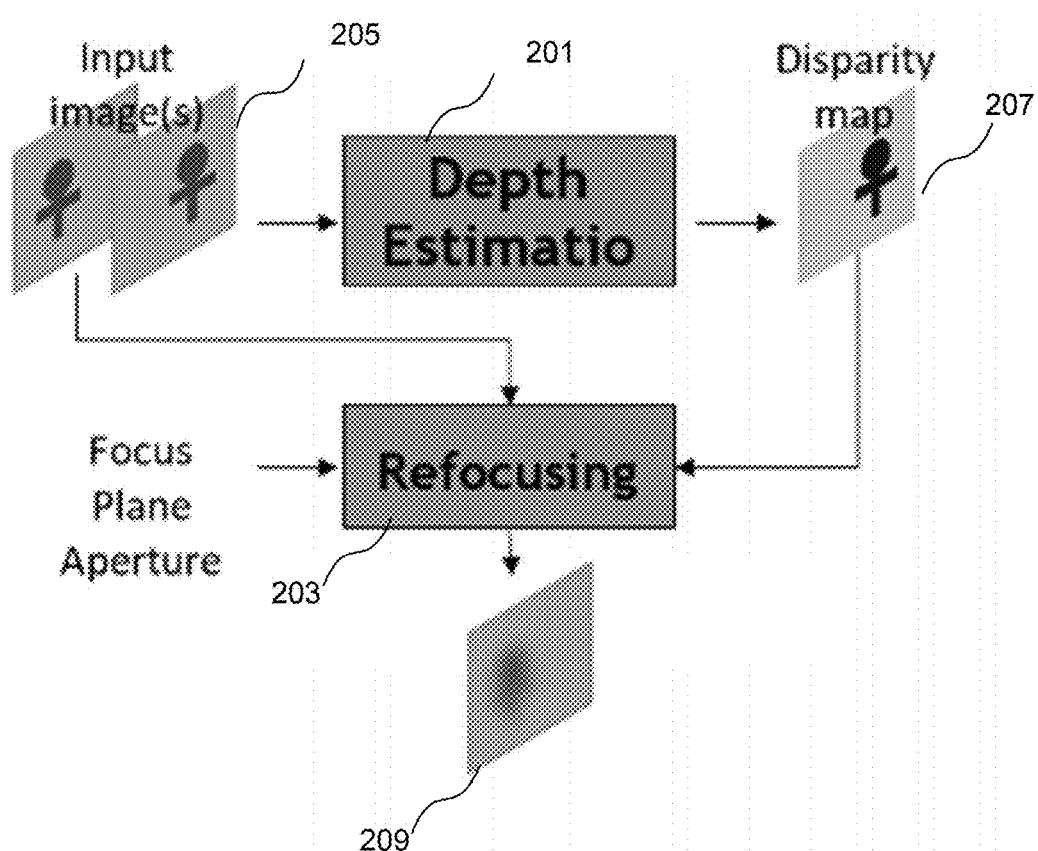
FIG. 2 shows an overview of the stages for generating a refocused image from an input image and a map indicating depth information for the input image.

FIG. 2 is a schematic illustration of a pipeline for performing computational image refocusing, according to the present application.

The computational pipeline is split into two general stages: depth estimation 201 and refocusing 203. The depth estimation stage 201 may be performed by a depth estimation module and the refocusing stage performed by a refocusing module. The depth estimation stage performs processing on the input images 205 representing a common scene to generate a map 207 containing depth information for the scene. In this example, the map is a disparity map, though in other examples it could be a depth map. The map (whether a depth map or disparity map) is an image encoding depth information for the scene represented in the input images 205. The pair of images may be stereo images.

One of the input images and the map 207 are input into the refocusing stage 203. Further parameters input into the refocusing stage 203 of the pipeline are a virtual aperture size and a virtual focal plane the final image will be refocused with. The values of the virtual aperture size and the focal plane may be configurable.

One approach to performing the refocusing stage 203 that can be implemented by the refocusing module will now be described.

First, a set of planes are defined. The planes may be depth planes or disparity planes, depending on whether the map is a depth map or a disparity map. A depth plane is a plane located at a certain depth within the acquired scene (i.e. the scene represented in images 205). A disparity plane is a plane at a certain disparity value within the acquired scene, that is, a plane associated with a certain disparity value. The planes (depth or disparity) are parallel to the image plane and the focal plane. The planes are also parallel to each other. The planes span a range of depths or disparities within the image. The inter-planar spacing of the planes may be equal to 1/a, where a is the size of the aperture. The span of the planes may be such that the depth range covered by the planes is less than or equal to the depth of field of the input images; i.e. the input images may have a depth of field that spans the depth range of the planes.

The refocusing stage is then performed by iteratively performing a sequence of processing steps for the set of planes. This sequence of steps will now be described.

1. For each plane $d \in [d_{min}, d_{max}]$, a depth mask, denoted $M^d$, is generated. The depth mask contains values indicating whether regions of the input image are within a specified range of the plane d. The mask contains an array of values corresponding to respective blocks of the input image, where each block is a block of one or more pixels. An image portion within block x of the input image is taken to be within the specified range of the plane d if the following condition is satisfied:

$$|D(x) - d'| < \frac{1}{a} \qquad (1)$$

where D (x) is the value of the map 207 for block x, d' is the depth or disparity value of plane d and a is the size of the aperture.

An assessment of whether the condition of equation (1) is satisfied can be made by evaluating the Heaviside step function, written as:

$$H(\xi) = \begin{cases} 0 & \text{if } \xi < 0 \\ 1 & \text{if } \xi \geq 0 \end{cases} \qquad (2)$$

where $\xi$ $M^d$ is an arbitrary quantity. Thus, in one example, the refocusing module may calculate values of the depth mask by evaluating equation (2) as:

$$M^d(x) = H\left(\frac{1}{a} - |D(x) - d'|\right) \qquad (3)$$

where $M^d(x)$ is the value of the depth mask for plane d and block x. In this example, values of '0' indicate regions of the image not within the specified depth of plane d, and values of '1' indicate regions of the image that are within the specified range of the plane d.

2. Having calculated the depth mask $M^d$, the refocusing module calculates a masked image for the plane d from the input image and the calculated depth mask for that plane. The masked image is an image containing only those portions of the input image determined to be within the specified range of the depth plane d.

Expressed mathematically, the refocusing module can calculate the masked image for plane d, denoted $I^d$, as:

$$I^d = M^d \circ I \qquad (4)$$

where I is the input image and '∘' is the entry-wise Hadamard product operator.

3. The refocusing module calculates a blurring kernel $K_r$ used to blur the masked image. The blurring kernel is in this example a radial kernel having a radius, denoted r. The value of the radius depends on the distance of the plane d from the focal plane, and the size of the aperture, a. The radius may be calculated according to the equation:

$$r = a|d' - d^f| \qquad (5)$$

where $d^f$ is the depth or disparity value of the focal plane.

4. The refocusing module then applies the blurring kernel to the masked image $I^d$ to generate a refocused partial image, denoted $I_b^d$. The blurring kernel is also applied to the depth mask $M^d$ to generate a refocused, or blurred, depth mask, denoted $M_b^d$.

The refocused partial image and refocused depth mask may be generated by convoluting the blurring kernel with the partial image and depth mask respectively. That is, the refocusing module may generate the refocused partial image and refocused depth mask by performing the calculations:

$$M_b^d = M^d * K_r \quad (6)$$

$$I_b^d = I^d * K_r$$

where $K_r$ is the blurring kernel having radius r and * denotes a convolution.

5. The refocusing module then combines the refocused partial image for plane d with the refocused partial images for planes that have been calculated in previous iterations of the refocusing stage. The refocused partial images may be combined from back to front in terms of depth, i.e. they are layered with the refocused partial images from planes associated with shallower depth values being layered on top of the refocused partial images from planes associated with deeper depth values. The refocused partial images may be combined by accumulating the block values for the partial images within a buffer. That is, the refocused partial images may be integrated to form the refocused image.

Expressed mathematically, the refocusing module may calculate a layered image, $I^f$, at each iteration of the refocusing stage as:

$$I^f = I^f \circ (1 - M_b^d) + I_b^d \quad (7)$$

The value of $I^f$ may be initialised with zeros.

The refocused depth mask for plane d may similarly be combined with the refocused depth masks for planes calculated in preceding iterations of the refocusing stage, i.e. the refocused depth masks may be integrated.

Expressed mathematically, the refocusing module may calculate a layered refocused depth mask, $M^f$, at each iteration of the refocusing stage as:

$$M^f = M^f \circ (1 - M_b^d) + M_b^d \quad (8)$$

The value of $M^f$ may be initialised with zeros.

6. Once the sequence of steps 1 to 5 has been performed for each plane in the set, the refocused image is generated by normalising the completed layered image $I^f$ with the layered refocused depth mask $M^f$. That is, the refocusing module calculates the refocused image as:

$$O = I^f \oslash M^f \quad (9)$$

where O is the final refocused image (shown at 209 in FIG. 2), and 'Ø' is the entry-wise Hadamard division operator.

Though the above-described algorithm enables a refocused image to be calculated from an input image, it suffers from the drawback that it cannot be used as a layer within a learnable pipeline. In other words, it is not possible to learn through the refocusing algorithm. It has been appreciated that the reason for this is that the gradient information cannot be backpropagated through stages of the algorithm to adjust the parameters used in that algorithm because the algorithm is not differentiable because the Heaviside step function, used to generate the depth mask at step 1, is not differentiable since it is not a continuous function.

Described herein is an approach to performing image refocusing that is learnable through suitable machine learning techniques.

Figure 3:
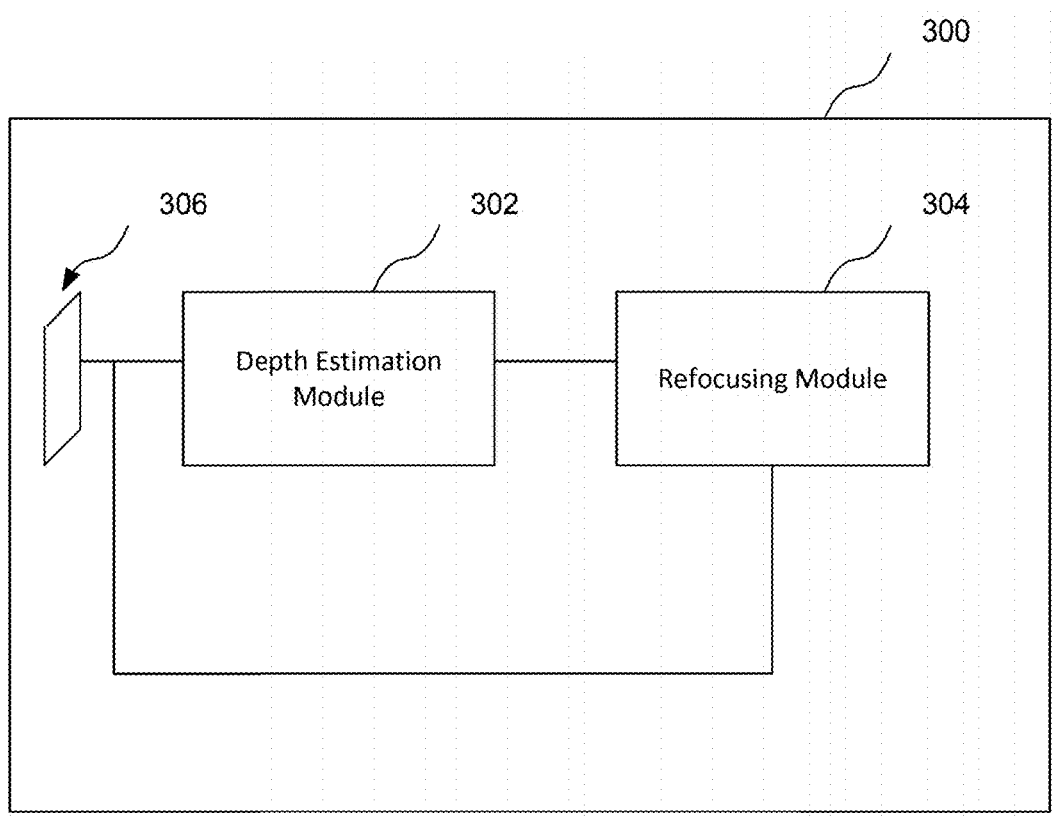
FIG. 3 is an example of an image processing device for generating refocused images from input images and maps indicating depth information for those images.

FIG. 3 shows an image processing device 300 that comprises a depth estimation module 302 and a refocusing module 304. Modules 302 and 304 may be implemented as part of a processor of the device 300. The depth estimation module 302 receives as its input digital images, denoted generally at 306, and generates from these digital images maps containing depth information for those digital images. The refocusing 304 module receives: (i) a generated map D from the depth estimation module 302 that contains depth information for a digital image I, (ii) the digital image I for which the map has been generated; and (iii) an indication of a focal plane $d^f$ and an aperture size a. The values of $d^f$ and a may be user set, i.e. configurable. They may be referred to as a virtual focal plane and virtual aperture. In the examples that follow, the map D may be a disparity map or a depth map. The map is an image that encodes depth information for the image I. A disparity map contains disparity values for blocks of one or more pixels of the input image, and a depth map contains depth values for blocks of one or more pixels of the input image. Due to the inverse relationship between disparity and depth, a disparity map can typically be calculated from a depth map and vice versa.

The refocusing module 304 operates to digitally refocus its received input image/using the received map D. The operation of the refocusing module will be described with reference to the flowchart in FIG. 4.

The refocusing module 304 defines a plurality of planes d. The planes may be disparity planes (i.e. planes at a certain disparity value in the scene represented in the input image) if the map is a disparity map or depth planes (i.e. planes at a certain depth value in the scene represented in the input image) if the map is a depth map. Due to the relationship between depth and disparities, the planes (whether disparity or depth) can be said to be associated with depths within the image.

The planes are parallel to the image plane and the focal plane. The planes are also parallel to each other. The planes span a range of depths or disparities within the image, and range from a plane associated with minimum depth level, denoted $d_{min}$ to a plane associated with a maximum depth level $d_{max}$. For clarity, it is noted that the 'minimum depth level' refers to the minimum depth level for the plurality of planes and the 'maximum depth level' refers to the maximum depth level for the plurality of planes and does not imply any limitations or restrictions on the values of the maximum and minimum depth for the image. The interplanar spacing of the planes may be equal to 1/a, where a is the size of the aperture. The depth span of the planes may be less than or equal to the depth of field of the input image I; i.e. the input images may have a depth of field that spans the depth range of the planes. In some examples, the input image may be an all-in-focus image, though it need not be. In other examples, the depth span of the planes may not be dependent on the aperture size a, but might be empirically set.

Steps 402 to 408 are performed for each of the plurality of planes. In other words, the refocusing module 304 iteratively performs a sequence of processing steps (steps 402 to 408) for the plurality of planes. Steps 402 to 408 are performed for each plane in sequence, starting from either the plane $d_{min}$ or the plane $d_{max}$. That is, the refocusing module may perform steps 402 to 408 for each successively deeper depth plane, starting from plane $d_{min}$, or it may perform steps 402 to 408 for each successively shallower depth plane, starting from plane $d_{max}$.

At step 402, the refocusing module 304 generates a depth mask for plane d, denoted $M^d$. The depth mask contains values indicating whether regions of the input image I are within a specified range of the plane d. The depth mask contains an array of values corresponding to respective blocks of the image I, where each block is a block of one or more pixels. The depth mask may contain values corresponding to each pixel of the image I. A region of the image I within block x of that image is taken to be within the specified range of the plane d if the condition specified in equation (1) above is satisfied, repeated below for convenience:

$$|D(x) - d'| < \frac{1}{a} \qquad (1)$$

where D(x) is the value of the map for block x, d' is the depth (if D is a depth map) or disparity (if D is a disparity map) of plane d and a is the size of the aperture.

The refocusing module 304 assesses whether a region is within the specified range of the depth plane by evaluating a differentiable function. The differentiable function is a function of the range between regions of the input image and the plane d, as determined from the map D(x). Put another way, the refocusing module 304 evaluates the differentiable function for a block x of the image I to determine whether the region of the image within that block is within the specified range of the plane d; i.e., the value of the evaluated function indicates whether the region is or is not within the specified range of the plane d.

Thus, the refocusing module 304 evaluates the differentiable function for a block x to assess whether the condition of equation (1) is satisfied for that block.

The differentiable function is differentiable (i.e. continuous in its first derivative) across the domain over which it is defined. The function may vary smoothly between a lower bound and an upper bound, the upper and lower bounds defining a range of function values. The differentiable function preferably returns a value within a first sub-range of function values when evaluated for an image region that is within the specified range of the plane d and returns a value within a second non-overlapping sub-range of function values when evaluated for an image region that is not within the specified range of the plane d. This enables the values of the evaluated function to indicate whether an image region is within the specified range of the plane d or not.

The function might for example vary from a substantially constant first value to a substantially constant second value, e.g. by varying smoothly from a first asymptotic value to a second asymptotic value. The function might transition from the first value to the second value about the point at which the range is equal to the specified range, i.e.

$$|D(x) - d'| < \frac{1}{a}.$$

The function values transition from the first sub-range of values to the second sub-range of values at the point at which the range is equal to the specified range.

The differentiable function may be a smooth approximation to the Heaviside step function. It has been appreciated that one convenient differentiable approximation to the Heaviside function of equation (2) is the tanh function:

$$\tilde{H}(\xi) = \frac{1}{2} + \frac{1}{2}\tanh(\alpha\xi) \qquad (10)$$

Figure 5:
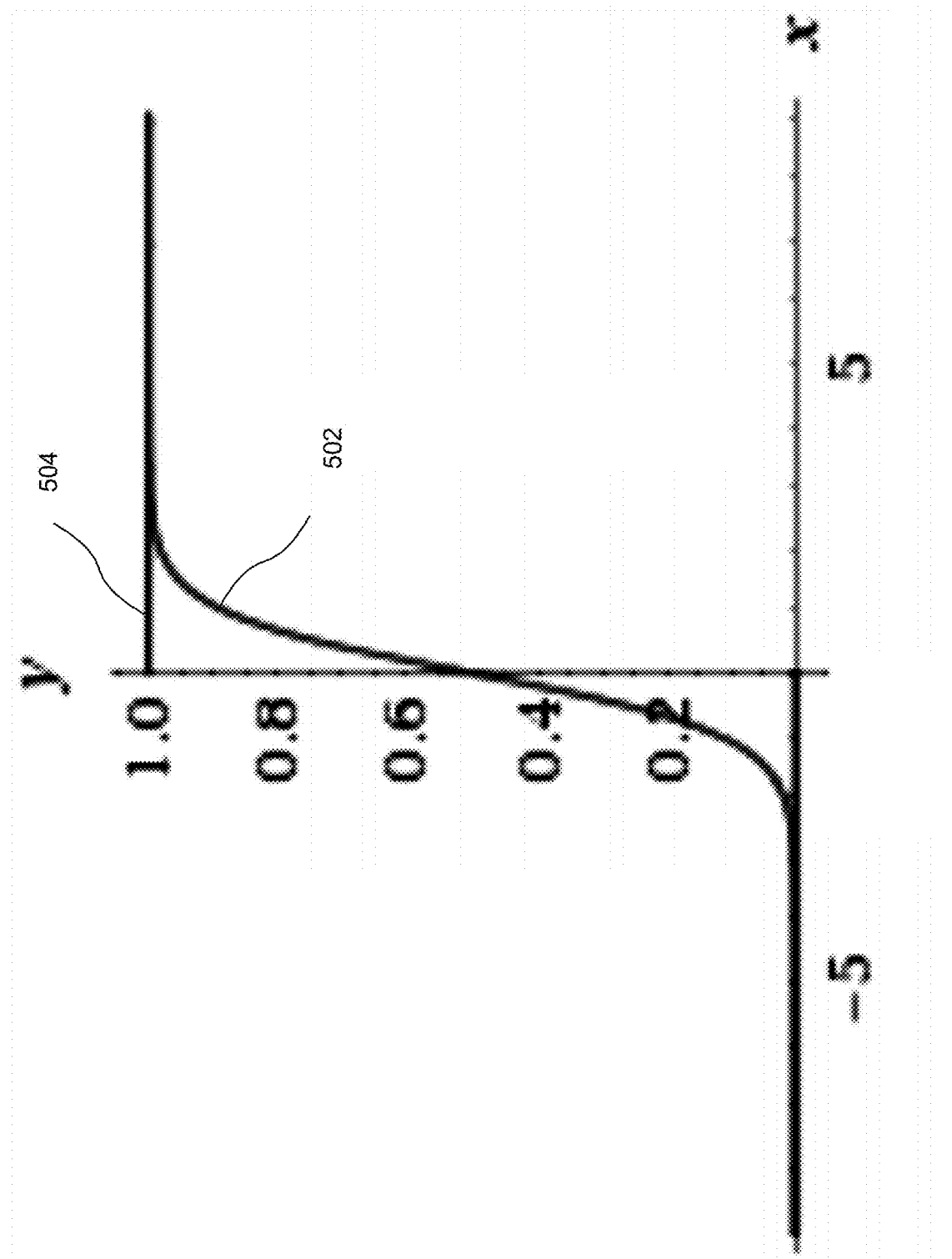
FIG. 5 is a graph illustrating the approximation of the Heaviside step function with a differentiable function.

FIG. 5 shows an example tanh function y=tanh(x) (denoted at 502) approximating the Heaviside step function H(x) (denoted at 504).

Thus, in one example, the refocusing module 304 may calculate values of the depth mask $M^d$ by evaluating equation (10), i.e.

$$M^d(x) = \frac{1}{2} + \frac{1}{2}\tanh\left(\alpha\left(\frac{1}{a} - |D(x) - d'|\right)\right) \qquad (11)$$

where α is a constant that controls the sharpness of the transition of the approximation. The value of α may be configurable. It may be set empirically. In general, larger values of a may be used to more closely approximate the Heaviside function. The value of α might for example be greater than 500, or greater than 1000.

It will be appreciated that, in other examples, the differentiable function may not be a tanh function, but may adopt different forms.

At step 404 the refocusing module 304 generates a masked image from the input image I and the depth mask $M^d$. The masked image, or partial image, is denoted $I^d$, where the superscript 'd' denotes the masked image is generated for plane d. The masked image is an image containing only those portions of the input image determined to be within the specified range of the plane d, and may be calculated in accordance with equation (4) above.

The refocusing module 304 may also calculate a blurring kernel as described above with respect to step 3.

At step 406, the refocusing module 304 refocuses the masked image $I^d$ using the blurring kernel to calculate a refocused partial image, denoted as described above with respect to step 4 and equation (6).

The refocusing module 304 further calculates a blurred depth mask $M_b^d$ as described above with respect to step 4 and equation (6).

At step 408, the refocusing module 304 layers the refocused partial image $I_b^d$ on a partially-recreated refocused image $I^f$ generated from previous iterations of the refocusing stage. In this example, the refocused partial images are combined from back to front in terms of depth, i.e. they are layered so that the refocused partial images associated with shallower depth planes are layered on top of the refocused partial images associated with deeper depth planes. The refocused partial images may be combined by accumulating the block values for the partial images within a buffer for each iteration of the method. That is, the refocused partial images may be integrated to form the refocused image.

Expressed mathematically, the refocusing module 304 may create a layered image, $I^f$, at each iteration of the refocusing stage as:

$$I^f = I^f \circ (1 - M_b^d) + I_b^d \qquad (7)$$

That is, the refocusing module 304 combines the refocused partial image for plane d with the refocused partial images for planes that have been calculated in previous iterations. Multiplication of the layered image $I^f$ by the term $(1-M_b^d)$ reduces intensity leakage by preventing block values for regions not within the specified range of the plane d from being updated by the blurred refocused partial image.

The refocused depth mask for plane d may similarly be combined with the refocused depth masks for planes calculated in preceding iterations of the refocusing stage, i.e. the refocused depth masks may also be integrated.

Expressed mathematically, the refocusing module 304 may calculate a layered refocused depth mask, $M^f$, at each iteration of the refocusing stage as:

$$M^f = M^f \circ (1 - M_b^d) + M_b^d \qquad (8)$$

After steps 402-408 have been performed for all the plurality of planes $d \in [d_{rain}, d_{max}]$, the refocusing module 304 has formed a completed layered image $I^f$ from layering the refocused partial images, and has formed a layered refocused depth mask. From this, the refocusing module generates the refocused image, denoted O. The refocused image is generated by normalising the completed layered image $I^f$ with the completed layered refocused depth mask $M^f$. That is, the refocusing module 304 calculates the refocused image as:

$$O = I^f \oslash M^f \qquad (9)$$

The refocusing module 304 therefore generates the refocused imaged from the plurality of refocused partial images.

The above-described method uses a differentiable function to generate depth masks for each plane that indicate regions of the input image within a specified range of that plane. The use of the differentiable function makes the overall algorithm described above with respect to FIG. 4 differentiable. This is convenient because it enables the method to be used as part of a pipeline for generating refocused images from input images that is learnable with a range of learning techniques. Some examples of how this method can be implemented within a learnable refocusing pipeline will now be described.

Figure 4:
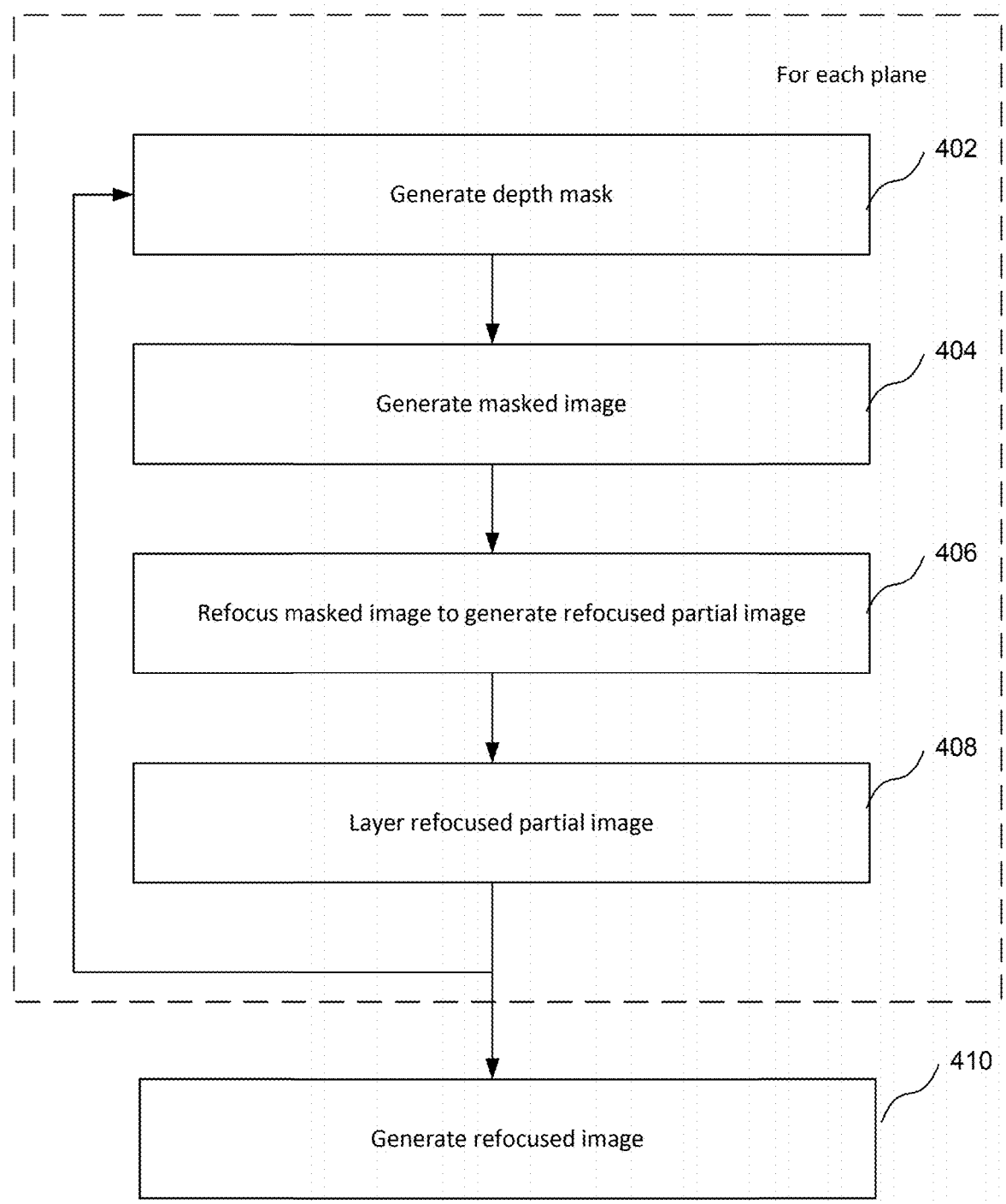
FIG. 4 is a flowchart showing a method of generating a refocused image from an input image and a map indicating depth information for the input image according to an embodiment of the present disclosure.

Though the method described with respect to FIG. 4 is suitable for implementation with a range of learning techniques, for the purposes of illustration only, examples will be provided referencing the "StereoNet" pipeline.

Figure 6:
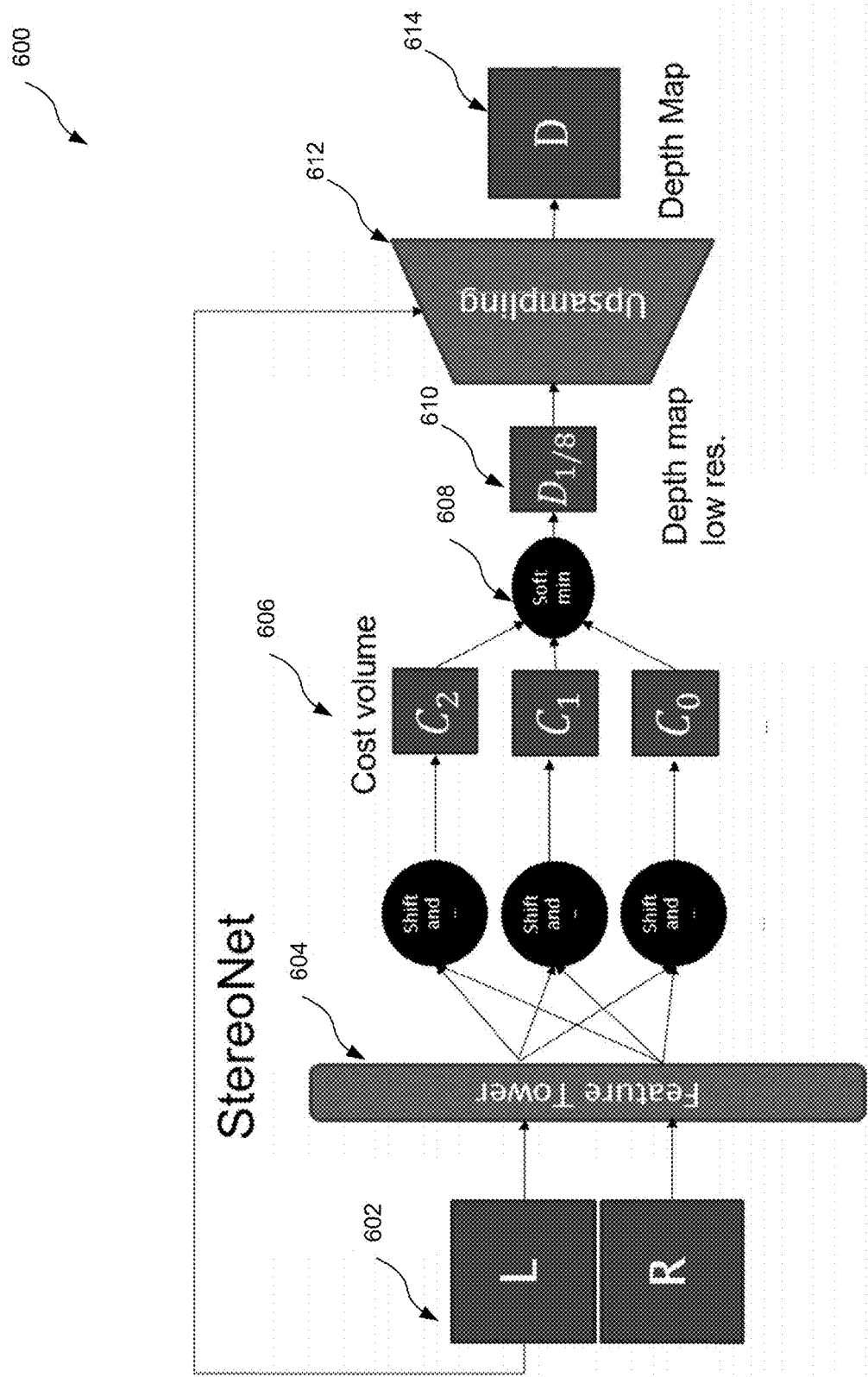
FIG. 6 is a schematic illustration of an example StereoNet pipeline for estimating a map from a pair of stereo images.

An example of the StereoNet pipeline is shown in FIG. 6. The StereoNet pipeline 600 operates to estimate a map D from a pair of images representing a common scene. The pair of images may be stereo images. The map D may be a disparity map or a depth map.

The pair of stereo images are shown at 602 and include a 'left image' and a 'right image'. In other examples, the images 602 are not 'left' and 'right' images but are some other pair of images representing a common scene. The pair of images are input into a feature extraction network 604 that extracts features from the images. The features may be extracted at a reduced resolution compared to the resolution of the input images 602.

The extracted features are then compared across a plurality of disparity planes. To do this, the features extracted from one of the pair of images (the left image, in this example) are shifted to each of the plurality of disparity planes and then compared with the features extracted from the other image of the pair of images (the right image, in this example). The comparisons are performed by calculating the difference between the shifted feature from one of the images with the non-shifted feature from the other of the images. This may be done by calculating the difference (e.g. in value) between co-located blocks for the shifted features and non-shifted features. The calculated differences for each disparity plane form a respective slice of a cost volume 606.

The cost volume 606 is passed through a softmin function 608 and from this a disparity map 610 is calculated. The disparity map 610 is a low-resolution image, i.e. at reduced resolution compared to input images 602. In this example, the disparity map is ⅛th the resolution of the input images. The low-resolution map is then upsampled using an upsampling network 612 to generate map 614, which in this example is a disparity map. The disparity map could, in other examples, be processed to generate the corresponding depth map. The map 614 is an image of equal resolution to the images 602.

Figure 7:
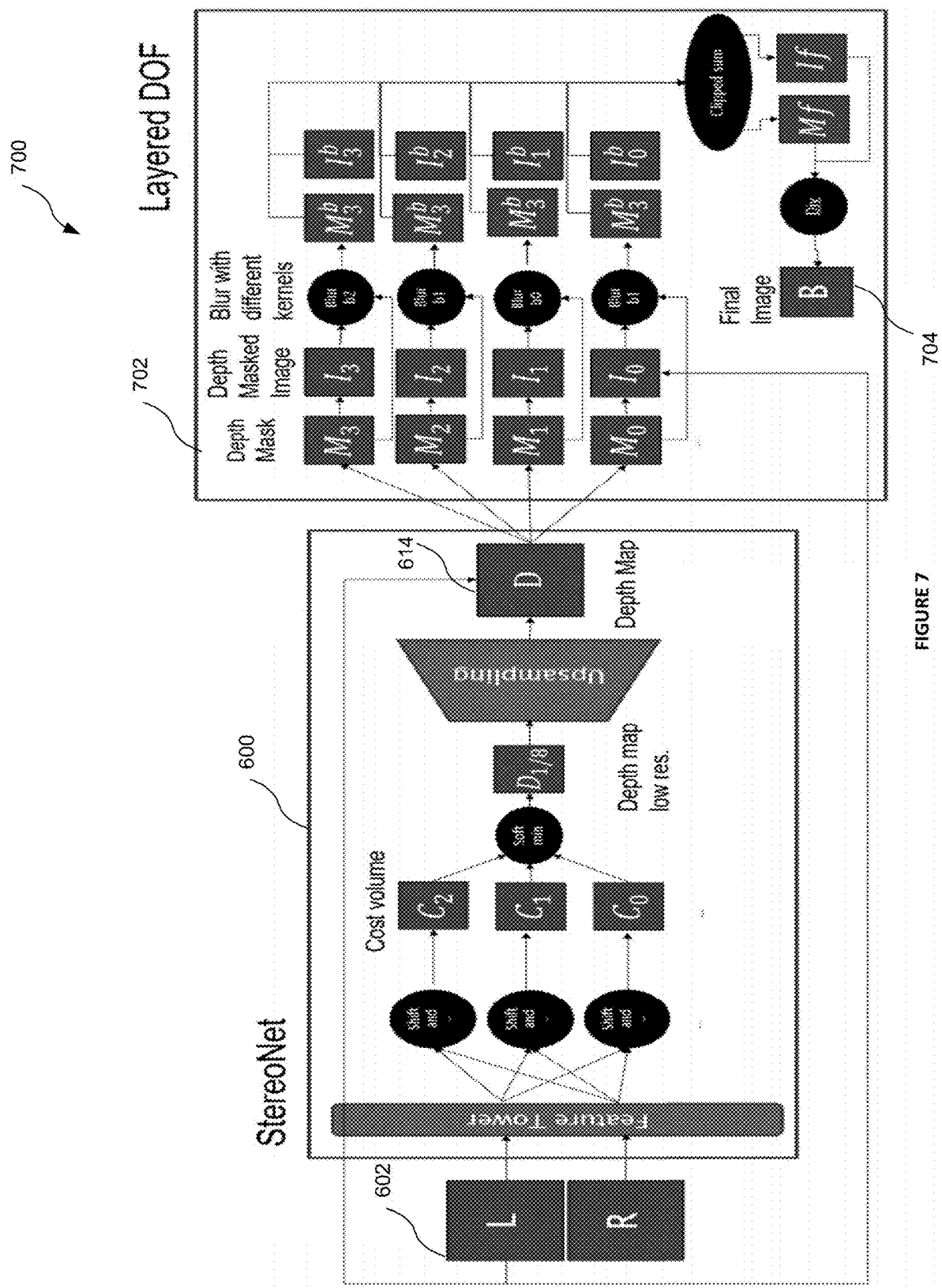
FIG. 7 is a schematic illustration of an example learnable pipeline that generates a refocused image from a pair of stereo images.

FIG. 7 shows one example architecture for implementing the differentiable approach of calculating a refocused image from an input image to form a learnable refocusing pipeline.

The refocusing pipeline 700 in FIG. 7 includes depth estimation stage 600 and refocusing stage 702. The depth estimation stage 600 could be implemented by the depth estimation module 302 of FIG. 3, and the refocusing stage could be implemented by the refocusing module 304.

To train, or adapt, the refocusing pipeline 700, a plurality of tuples of images may be used. Each tuple of images may include a pair of images representing a common scene, and a training image of the scene. The pair of images may be stereo images formed of a 'left image' and a 'right image'. Such a pair of images are shown at 602. The training image may be a ground truth image. The training image may be a shallow DOF image. For completeness, it is noted the training image is not shown in FIG. 7.

For a tuple of images, the pair of images of that tuple representing the common scene are input into the depth estimation stage 600. The depth estimation stage 600 estimates from this pair of images the map 614, as described above with reference to FIG. 6.

The calculated map 614 is then input into the refocusing stage 702. One of the pair of images 602 is also input into the refocusing stage 702. The refocusing stage 702 then calculates a refocused image 704 from the estimated map 614 and the input image in the manner described above with reference to FIG. 4.

The difference between the calculated refocused image 704 and the training image of the tuple is then calculated and fed back to the depth estimation stage 600. The difference between the estimated refocus image and the training image may be fed back as residual data. The residual data is fed back to the depth estimation stage 600 to adapt the parameters used by that stage to estimate maps from pairs of images.

Figure 8:
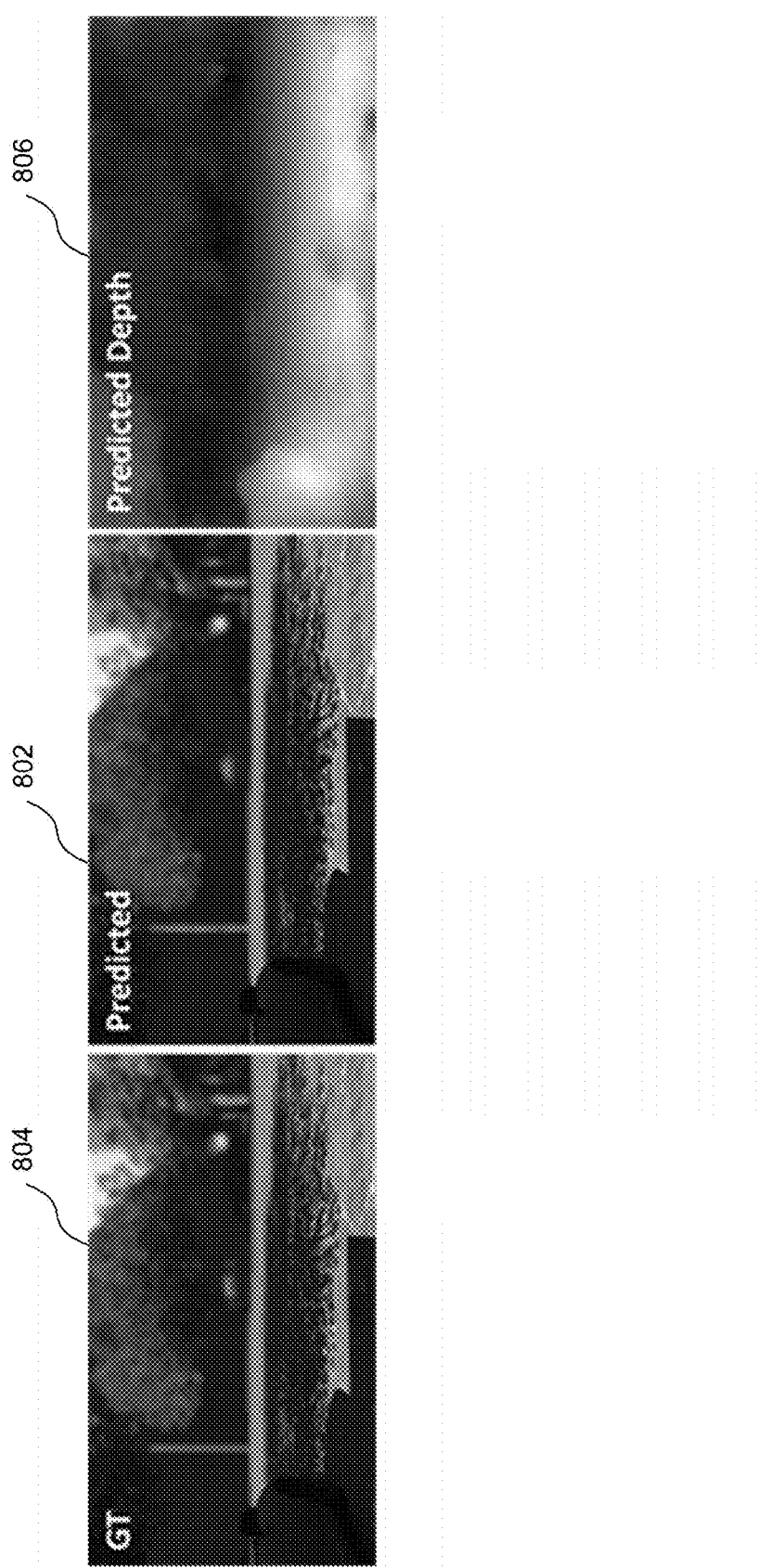
FIG. 8 shows an example predicted image obtained using the pipeline of FIG. 7.

FIG. 8 shows an example of a predicted refocused image 802 that has been obtained by the inventors from a ground truth image 804. The estimated map 806 is also shown.

Figure 9:
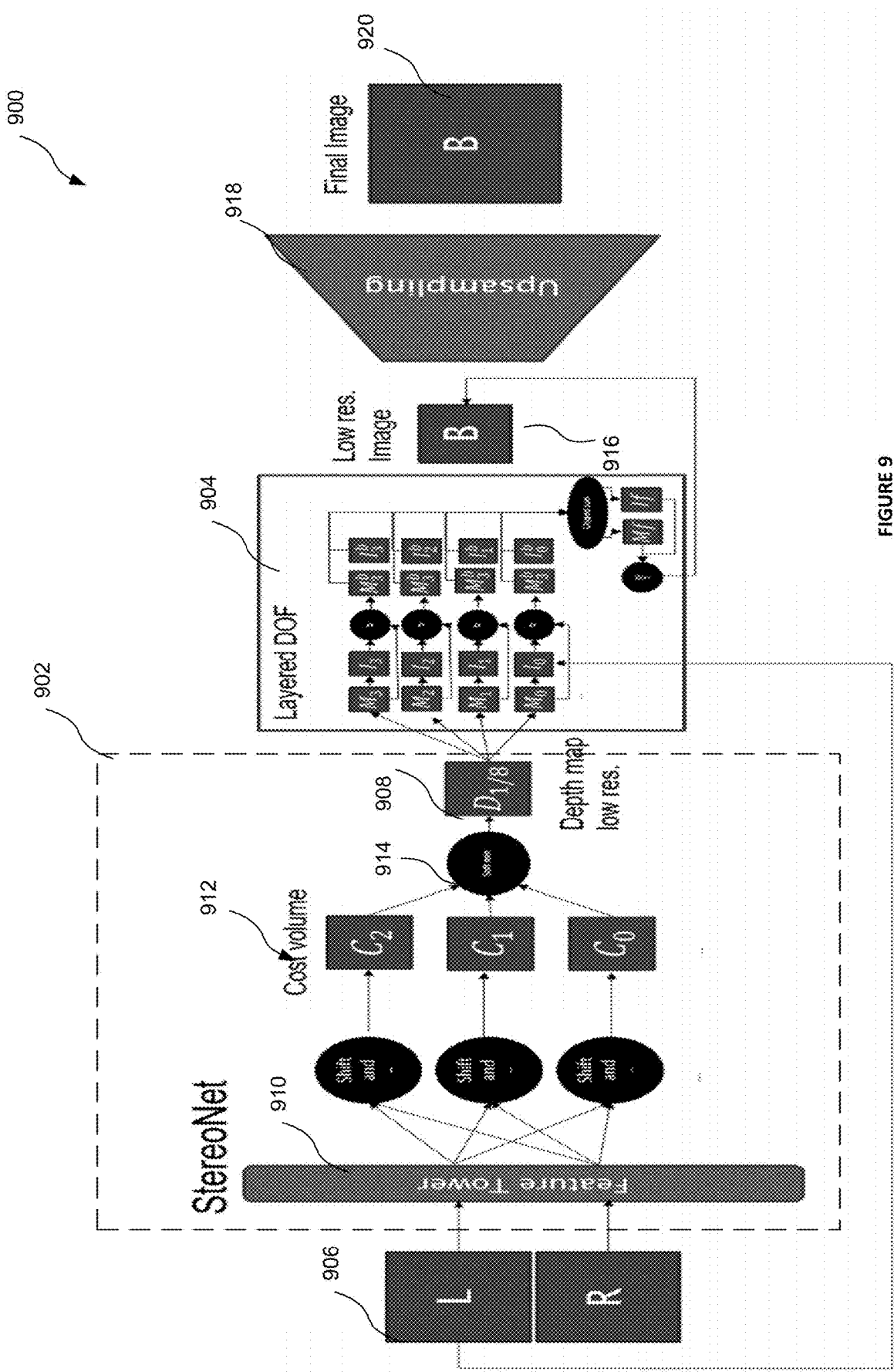
FIG. 9 is a schematic illustration of another example learnable pipeline that generates a refocused image from a pair of stereo images.

FIG. 9 shows another example architecture for implementing the differentiable approach of calculating a refocused image from an input image to form a learnable refocusing pipeline.

The refocusing pipeline 900 in FIG. 9 includes depth estimation stage 902 and refocusing stage 904. The depth estimation stage 902 could be implemented by the depth estimation module 302 of FIG. 3, and the refocusing stage 904 could be implemented by the refocusing module 304.

To train, or adapt, the refocusing pipeline 900, a plurality of tuples of images may be used. Each tuple of images may include a pair of images representing a common scene, and a training image of the scene. The pair of images may be stereo images formed of a 'left image' and a 'right image'.

Such a pair of images are shown at 906. The training image may be a ground truth shallow DOF image.

For each tuple of images, the pair of images of that tuple representing the common scene are input into the depth estimation stage 900. The depth estimation stage 900 estimates from this pair of images map 908.

To estimate the map 908, the pair of images are input into a feature extraction network 910 that extracts features from the images. The features may be extracted at a reduced resolution compared to the resolution of the input images 906.

The extracted features are then compared across a plurality of disparity planes. To do this, the features extracted from one of the pair of images (the left image, in this example) are shifted to each of the plurality of disparity planes and then compared with the features extracted from the other image of the pair of images (the right image, in this example). The comparisons are performed by calculating the difference between the shifted feature from one of the images with the non-shifted feature from the other of the images. This may be done by calculating the difference (e.g. in value) between co-located blocks for the shifted features and non-shifted features. The calculated differences for each disparity plane form a respective slice of cost volume 912.

The cost volume 912 is passed through a softmin function 914 and from this the map 908 is calculated. The map 908 is a low-resolution image, i.e. at reduced resolution compared to the pair of images 906. In this example, the map is ⅛th the resolution of the input images. The output of the softmin function 914 is a disparity map and thus map 908 could be a disparity map or could be further processed to generate a depth map.

The calculated map 908 is then input into the refocusing stage 904. One of the pair of images 906 (in this example the left image) is downsampled and also input into the refocusing stage 904. The input image may be downsampled to be of equal resolution to the map 908. The downsampling is not shown in FIG. 9.

The refocusing stage 904 then calculates a reduced-resolution refocused image 916 from the estimated map 908 and the input image (which is a downsampled version of one of the pair of images 906). The refocusing stage 904 calculates the reduced resolution refocused image 916 from these inputs in accordance with the method described above with reference to FIG. 4.

The reduced-resolution refocused image 916 is then upsampled by upsampling network 918 to generate the refocused image 920. The refocused image 920 is a full resolution image, i.e. it is of equal resolution to the images 906. This upsampling may also be performed by the refocusing module 304.

The difference between the refocused image 920 and the training image of the tuple is then calculated and fed back to the depth estimation stage 902. The difference between the estimated refocused image 920 and the training image may be fed back as residual data. The residual data is fed back to the depth estimation stage 902 to adapt the parameters used by that stage to estimate maps from pairs of images.

Figure 10:
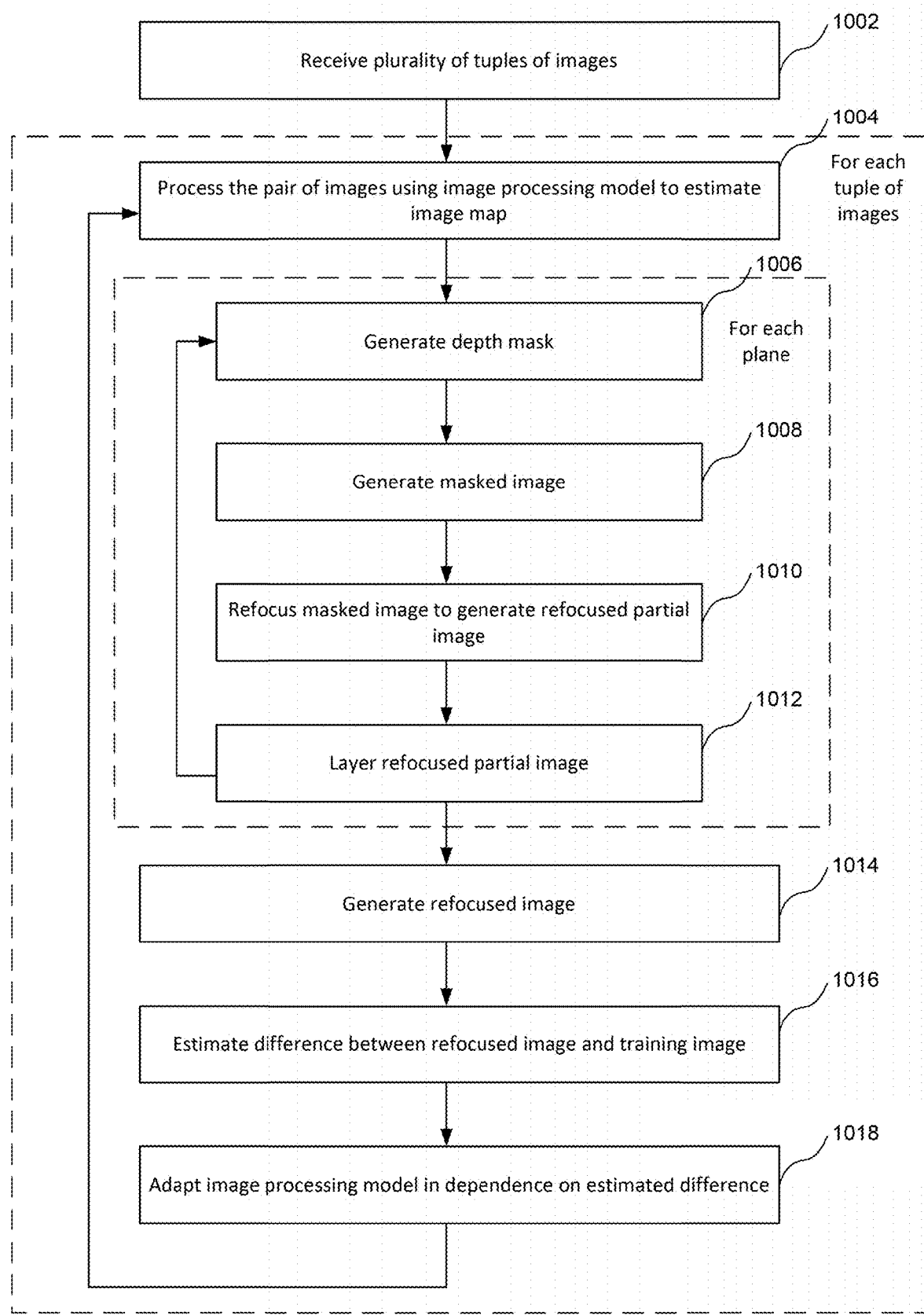
FIG. 10 is a flowchart showing a method of adapting an image processing model.

A summary of how pipelines 700 and 900 can be trained, or adapted, to generate refocused images from pairs of input images is now provided with reference to the flowchart of FIG. 10.

At step 1002, a plurality of tuples of images are received, e.g. by the depth estimation module 302. Each tuple of images comprises a pair of images representing a common scene (e.g. images 602 or 906), and a refocused training image which may be, for example, a ground truth image.

Steps 1004 to 1018 are performed for each tuple of images.

At step 1004, a pair of images for a tuple are processed using an image processing model to estimate a map D. Step 1004 may be performed by the depth estimation module 302. The image processing model may correspond to the depth estimation stage 600 shown in FIG. 7 or the depth estimation stage 902 shown in FIG. 9. In other words, performance of the image processing model may comprise the steps of performing the depth estimation stage 600 or 902. The map might be a disparity map or a depth map. The map may be of the same resolution as the pair of images in the tuple (e.g. like map 614), or it may be of reduced resolution compared to the pair of images (e.g. like map 908).

Steps 1006 to 1014 may be performed by refocusing module 304. These steps may correspond to the refocusing stage 702 shown in FIG. 7 or the refocusing stage 904 shown in FIG. 9. These steps are performed using the map D generated at step 1004 and an input image I. The input image may be one of the pair of images for the tuple (e.g. as in pipeline 700), or it may be an image formed from one of the pair of images for the tuple (e.g. as in pipeline 900, where the input image to the refocusing stage 902 is formed by downsampling one of the stereo images 906).

Steps 1006 to 1012 are performed for each of a plurality of planes associated with respective depths within the input image. Each plane may be a depth plane (if the map generated at step 1004 is a depth map) or a disparity plane (if the map generated at step 1004 is a disparity map).

At step 1006, a depth mask $M_b^d$ is generated. The depth mask has values indicating whether regions of the input image are within a specified range of the plane. An assessment of whether a region is within the specified range of the plane is made by evaluating a differentiable function of the range between regions of the input image and the plane, as determined from the estimated map and described above with respect to FIG. 4.

At step 1008, a masked image $I^d$ is generated from the depth mask $M_b^d$ and the input image I.

At step 1010, the masked image is refocused using a blurring kernel $K_r$ to generate a refocused partial image, $I_b^d$.

At step 1012, the refocused partial image is layered over a partially recreated refocused image $I^f$.

Steps 1006 to 1012 correspond to steps 402 to 408 of FIG. 4 and so a detailed explanation of these steps will not be repeated here.

Once steps 1006 to 1012 have been performed for each plane, a refocused image O is generated at step 1014.

The refocused image may be generated directly from normalising the final layered image $I^f$ with the layered blurred depth mask $M^f$, for example like refocused image 704 in pipeline 700. This approach might be adopted when the final layered image $I^f$ is of equal resolution to the pair of images of the tuple (e.g. as in pipeline 700).

Alternatively, the refocused image may be generated by first normalising the final layered image $I^f$ with layered blurred depth mask $M^f$ to generate a reduced-resolution refocused image and then upsampling this image to generate the refocused image O. This is the case, for example, in pipeline 900, where the final layered image $I^f$ is of reduced resolution compared to images 906 and is used to generate reduced-resolution refocused image 916. Image 916 is then upsampled to generate the refocused image 920.

At step 1016, the difference between the refocused image and the training image of the tuple is estimated. The estimated difference is then fed-back to the depth-estimation stage and used to adapt the image processing model (step 1018).

The above examples illustrate how the method of generating a refocused image from an input image using a differentiable function can be used to produce a fully learnable pipeline for performing refocusing.

Figure 11:
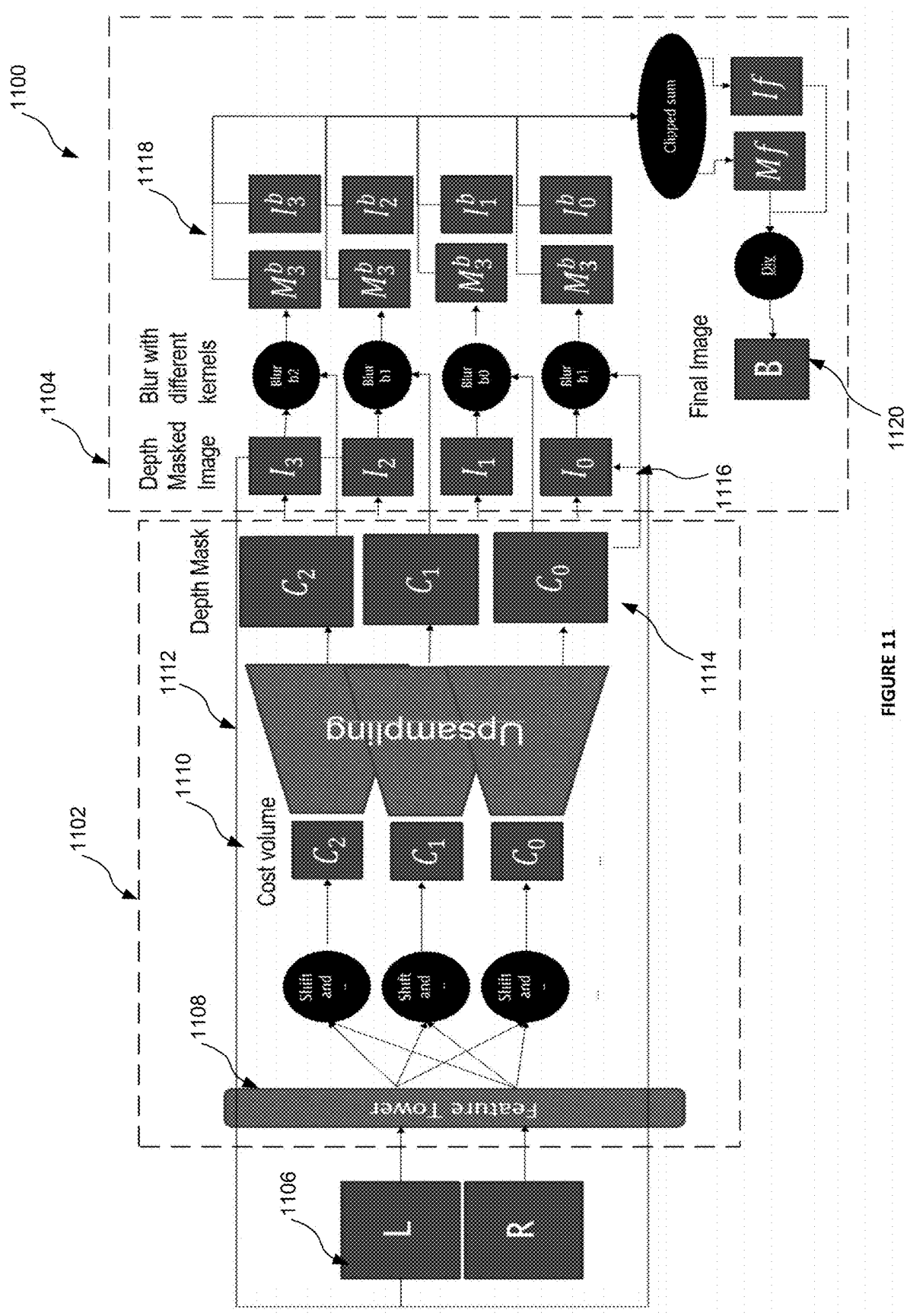
FIG. 11 is a schematic illustration of a further example learnable pipeline that generates a refocused image from a pair of stereo images.

FIG. 11 shows another example architecture for calculating a refocused image from an input image to form a learnable refocusing pipeline. The pipeline 1100 includes a depth processing stage 1102 implemented using an image processing model, and a refocusing stage 1104. The depth processing stage 1102 may be performed by depth estimation module 302, and refocusing stage 1104 may be performed by refocusing module 304.

Figure 12:
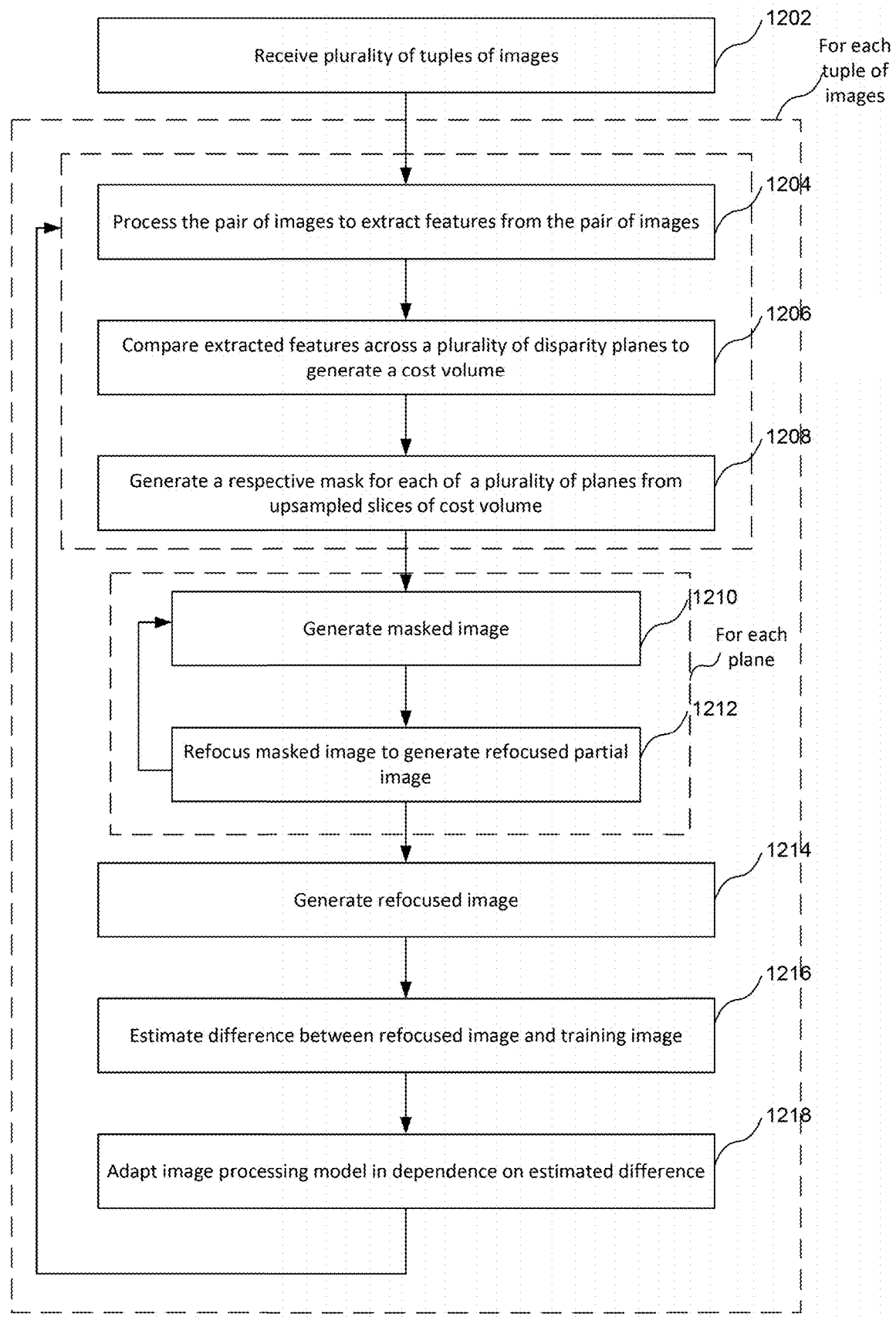
FIG. 12 is a flowchart showing a method of adapting an image processing model with the pipeline in FIG. 11.

The operation of the pipeline 1100 will be described with reference to the flowchart of FIG. 12.

At step 1202, a plurality of tuples of images are received, e.g. by the depth estimation module 302. Each tuple of images comprises a pair of images representing a common scene and a refocused training image which may be, for example, a ground truth image. Each pair of images may be stereo images including a 'left image' and a 'right image'. An example of a pair of stereo images is shown at 1106. The training image might be an all-in-focus image, though it need not be.

Steps 1204 to 1218 are performed for each tuple of images.

Steps 1204 to 1208 form part of an image processing model that is used to process the pair of images 1106 as part of the depth processing stage 1102. Put another way, the depth processing stage 1102 is performed by using an image processing model to process the pair of images 1106 in accordance with steps 1204 to 1208.

At step 1204, the pair of images 1106 are input into a feature extraction network 1108. The feature extraction network 1108 is a computational neural network that extracts features from the images. The features may be extracted at a reduced resolution compared to the resolution of the input images 1106.

At step 1206, the extracted features are compared across a plurality of disparity planes. To do this, the features extracted from one of the pair of images (the left image, in this example) are shifted to each of the plurality of disparity planes and then compared with the features extracted from the other image of the pair of images (the right image, in this example). The comparisons are performed by calculating the difference between the shifted feature from one of the images with the non-shifted feature from the other of the images. This may be done by calculating the difference (e.g. in value) between corresponding blocks of the shifted features and non-shifted features. The calculated differences for each disparity plane form a respective slice of a cost volume 1110. The slices of the cost volume are denoted in FIG. 11 at $C_0$, $C_1$ and $C_2$. Each slice of the cost volume indicates (reduced-resolution) disparity information for the pair of input images 1106. Thus, each slice of the cost volume is associated with a respect disparity plane.

At step 1208, a mask $M^d$ for each of a plurality of planes d associated with respective depths within one of the pair of images 1106 is generated by upsampling a respective slice of the cost volume 1110. In other words, each slice of the cost volume is upsampled to form a respective mask $M^d$, that mask being associated with a plane d. The upsampling is shown at 1112.

The planes associated with the masks may be disparity planes or depth planes. Masks associated with respective disparity planes may be generated directly from upsampling respective slices of the cost volume. To generate masks associated with depth planes, the cost volumes are upsampled and the resulting masks (which would be associated with disparity planes) further processed to generate masks associated with respective depth planes. The masks created from upsampling respective slices of the cost volume are shown at 1114.

The calculated masks $M^d$ are then used in the refocusing stage of the pipeline, 1104. Thus, in contrast to the methods described above in which depth masks $M^d$ generated from an estimated depth/disparity map are used within the refocusing stage, in this method masks $M^d$ created from upsampling slices of the cost volume are used in the refocusing stage. In other words, the refocusing stage is performed using the cost volumes and not an estimated depth/disparity map D. This conveniently reduces the processing steps of the pipeline compared to pipelines that estimate depth/disparity maps.

The refocusing stage of the pipeline 1104 is performed by performing steps 1210 to 1214. These steps are performed using the masks 1114 generated at step 1208 and an input image I. The input image is in this example one of the pair of images for the tuple, i.e. one of the pair of images 1106.

Steps 1210-1212 are performed for each of the plurality of planes associated with the generated masks. As discussed, these planes may be disparity planes or depth planes.

At step 1210, a masked image for a plane d is generated from the input image and the generated mask $M^d$ for that plane. The masked image is demoted $I^d$. The masked image might be generated by multiplying the mask with the input image I. The masked images are shown in FIG. 11 at 1116.

At step 1212, the masked image $I^d$ is refocused using blurring kernel $k_r$ to generate a refocused partial image $I_b^d$. The mask $M^d$ is also refocused using the blurring kernel to generate a blurred mask $M_b^d$. The refocused partial images and blurred masks are shown at 1118.

The refocused partial image $I_b^d$ is then layered over a partially recreated refocused image $I'$ as described above.

Once steps 1210 and 1212 have been performed for each plane, a refocused image O is generated at step 1214 in the manner described above. The refocused image is shown at 1120.

At step 1216, the difference between the refocused image 1120 and the training image of the tuple is estimated. The estimated difference is then fed-back to the depth-estimation stage and used to adapt the image processing model (step 1218).

Described herein are approaches to refocusing an input image that are differentiable, enabling pipelines to be formed for refocusing input images that are learnable through machine learning techniques. In some of the examples herein, the pipelines produce depth/disparity maps between the depth estimation and refocusing stages, enabling the estimated depth maps to be refined through suitable deep learning techniques. The approaches and pipelines described herein can be made computationally efficient and tractable, enabling them to be deployed within a wide range of computational architectures, for example smartphone architectures. In addition, the approach to refocusing the image described herein results in a Bokeh that is motivated by the depth information of the image, which can provide higher quality results than other types of blur, such as Gaussian blur. The techniques described herein also enable refocused images to be rendered with arbitrary equivalent aperture sizes or focal planes, for example through suitable setting of the parameters in equation (1).

Though examples have been described herein in which a refocusing stage is implemented within a pipeline where depth estimation is performed using StereoNet, it will be appreciated this is for the purpose of illustration only, and that the approach to refocusing described herein does not depend on a particular type of depth estimation being used. It follows that the refocusing stages described herein can be implemented with various deep learning techniques to form a learnable pipeline, and are not limited to being implemented with the StereoNet pipeline.

The image processing devices described herein may be configured to perform any of the methods described herein. Generally, any of the methods, techniques or components described above can be implemented in software, hardware, or any combination thereof. The terms "module," and "unit" may be used to generally represent software, hardware, or any combination thereof. In the case of a software implementation, the module or unit represents program code that performs the specified tasks when executed on a processor. Any of the algorithms and methods described herein could be performed by one or more processors executing code that causes the processor(s) to perform the algorithms/methods. The code may be stored in a non-transitory computer readable storage medium such as, for example, random-access memory (RAM), read-only memory (ROM), an optical disc, hard disk memory, and other memory devices. The code could be any suitable executable code, for example computer program code or computer-readable instructions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the application.

The invention claimed is:

1. An image processing device comprising:
   at least one processor;
   a non-transitory computer-readable storage medium coupled to the at least one processor and storing programming instructions for execution by the at least one processor, wherein the programming instructions instruct the image processing device to generate a refocused image from an input image and a map indicating depth information for the input image, wherein generating the refocused image and the map comprises:
   for each of a plurality of planes associated with respective depths within the image:
      generating a depth mask having values indicating whether regions of the input image are within a specified range of the plane, wherein an assessment of whether a region is within the specified range of the plane is made through an evaluation of a differentiable function of a range between regions of the input image and the plane as determined from the map, wherein the differentiable function varies smoothly between a lower bound and an upper bound that defines a function value range, the differentiable function having a value within a first half of its range when an image region for which the differentiable function is being evaluated is within the specified range of the plane, and having a value within a second half of its range when an image region for which the differentiable function is being evaluated is not within the specified range of the plane;
      generating a masked image from the input image and the depth mask; and
      refocusing the masked image using a blurring kernel to generate a refocused partial image; and
      generating the refocussed image from the refocussed partial images.

2. The image processing device of claim 1, wherein the plurality of planes define a depth range, and the input image has a depth of field spanning the depth range of the plurality of planes.

3. The image processing device of claim 1, wherein: (i) the map indicating depth information for the image is a disparity map and each of the plurality of planes is a plane at a respective disparity value; or (ii) the map indicating depth information for the image is a depth map and each of the plurality of planes is a plane at a respective depth.

4. The image processing device of claim 3, wherein the image processing device is operable to evaluate the differentiable function to assess whether a condition of $$|D(x) - d'| < \frac{1}{a}$$

is satisfied, where $D(x)$ is a value of the disparity or depth map for an image region at a block x of the input image, d' is a disparity or depth of the plane and a is a size of an aperture, wherein an image region is determined to be within the specified range of the plane when the condition is satisfied and is determined not to be within the specified range of the plane when the condition is not satisfied.

5. The image processing device of claim 1, wherein the depth mask specifies values for each block of one or more pixels of the input image.

6. The image processing device of claim 1, wherein the blurring kernel is a radial kernel having a radius which is a function of a size of an aperture, and a difference in depth or disparity between the plane and a focal plane.

7. The image processing device of claim 1, wherein the masked image contains only regions of the input image determined to be within the specified range of the plane.

8. A method of training an image processing model, the method comprising:
   receiving a plurality of tuples of images, each tuple of images comprising a pair of images representing a common scene and a refocused training image of the scene;
   for each tuple of images:
      (i) processing the pair of images using the image processing model to estimate a map indicating depth information for the scene;
      (ii) for each of a plurality of planes associated with respective depths within the image:
         generating a depth mask having values indicating whether regions of an input image are within a specified range of the plane, wherein an assessment of whether a region is within the specified range of the plane is made through an evaluation of a differentiable function of a range between regions of the input image and the plane as determined from the map, wherein the differentiable function varies smoothly between a lower bound and an upper bound that defines a function value range, the differentiable function having a value within a first half of its range when an image region for which the differentiable function is being evaluated is within the specified range of the plane, and having a value within a second half of its range when an image region for which the differentiable function is being evaluated is not within the specified range of the plane;

generating a masked image from the input image and the depth mask; and refocusing the masked image using a blurring kernel to generate a refocused partial image;

(iii) generating a refocussed image from the refocussed partial images;

(iv) estimating a difference between the refocused image and the refocused training image to obtain an estimated difference; and (v) adapting the image processing model in dependence on the estimated difference.

9. The method of claim 8, wherein the map is of equal resolution to the pair of images and the input image is one of the pair of images.

10. The method of claim 8, wherein the map is of reduced resolution compared to the pair of images and the input image is formed as a reduced-resolution image of one of the pair of images.

11. The method of claim 10, wherein generating the refocused image is performed using the reduced resolution map and further comprises:

generating a reduced-resolution refocussed image from the refocused partial images; and up-sampling the reduced-resolution refocussed image to generate the refocused image.

12. A method of adapting an image processing model, the method comprising:

receiving a plurality of tuples of images, each tuple of images comprising a pair of images representing a common scene and a refocused training image of the scene;

for each tuple of images:

processing the pair of images using an image processing model, comprising:

(i) processing the pair of images using a computational neural network to extract features from the pair of images;

(ii) comparing the features across a plurality of disparity planes to generate a cost volume; and (iii) generating a mask for each of a plurality of planes associated with respective depths within an image from respective up-sampled slices of the cost volume;

performing a refocusing stage, comprising:

(iv) for each of the said plurality of planes associated with the respective depths:

generating a masked image from an input image and the mask;

refocusing the masked image using a blurring kernel to generate a refocused partial image;

(v) generating a refocussed image from the refocussed partial images;

(vi) estimating a difference between the generated refocused image and the refocused training image to obtain an estimated difference; and (vii) adapting the image processing model in dependence on the estimated difference.

13. An image processing model adapted by the method of claim 8 to generate a refocused image from a pair of input images representing a common scene.

14. An image processing device comprising:

at least one processor; and a non-transitory computer-readable storage medium coupled to the at least one processor and storing programming instructions for execution by the at least one processor, wherein the programming instructions instruct the image processing device to implement an image processing model adapted by the method of claim 8 generate a refocused image from a pair of input images representing a common scene.

* * * * *

UNITED STATES PATENT AND TRADEMARK OFFICE
CERTIFICATE OF CORRECTION

PATENT NO. : 11,943,419 B2
APPLICATION NO. : 17/479911
DATED : March 26, 2024
INVENTOR(S) : Benjamin Busam et al.

It is certified that error appears in the above-identified patent and that said Letters Patent is hereby corrected as shown below:

In the Claims

Column 18, Line 32, Claim 4, please delete "and a" and insert -- and α --.

Signed and Sealed this
Twenty-fifth Day of June, 2024

Katherine Kelly Vidal
*Director of the United States Patent and Trademark Office*